C. B. Ruth.
Corn Planter.
N° 98,193. Patented Dec. 21, 1869.
Fig. 1.
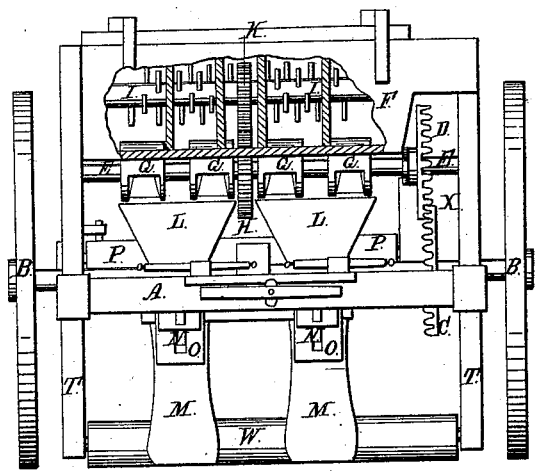
Fig. 5. Fig. 2. Fig. 7.
Fig. 6. Fig. 8.
Fig. 9.
Fig. 10.
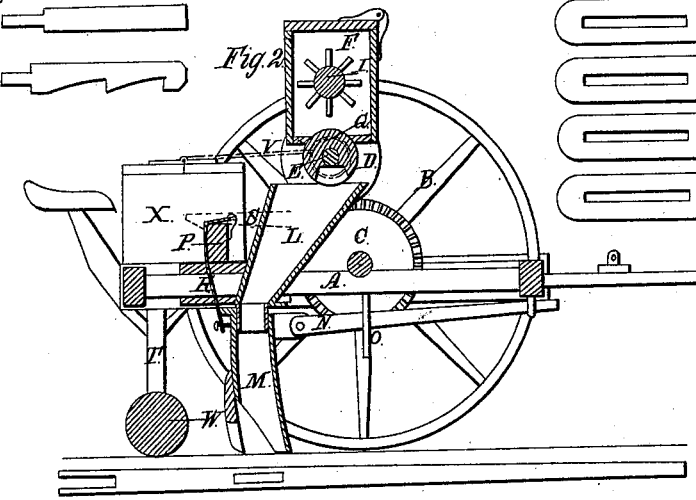
Fig. 11.
Fig. 3. 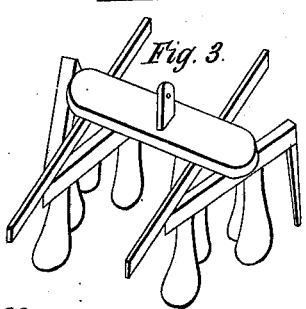 Fig. 4. 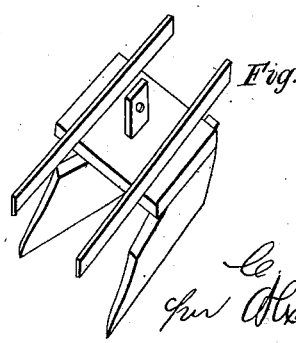
Witnesses.
William Wanslebon
J. A. Lehmann
Inventor.
C. B. Ruth
per Alexander & Mason
Attys.

United States Patent Office.

C. B. RUTH, OF DOYLESTOWN, PENNSYLVANIA.

Letters Patent No. 98,193, dated December 21, 1869; antedated December 11, 1869.

IMPROVEMENT IN CORN-PLANTERS.

The Schedule referred to in these Letters Patent and making part of the same.

*To all whom it may concern:*

Be it known that I, C. B. RUTH, of Doylestown, in the county of Bucks, and in the State of Pennsylvania, have invented certain new and useful Improvements in Corn-Planter; and do hereby declare that the following is a full, clear, and exact description thereof, reference being had to the accompanying drawings, and to the letters of reference marked thereon.

The nature of my invention consists in the construction of a corn-planter, which will drop the corn and compost both at the same time, and in the arrangement of the devices hereafter set forth and described.

Figure 1 is a front view of my invention.

Figure 2 is a section view of the same.

Figure 3 is a perspective of one of the plows.

Figure 4 is a similar view of the device for covering the corn.

Figures 5, 6, 7, 8, 9, 10, and 11, are views of various parts used in the construction of my machine.

Letter A represents the frame, which may be of any desired shape or form, and which is supported upon the driving-wheels B.

Upon the same axle as the wheels B, is placed the cog-wheel C, which gears with and communicates motion to a second one, D, of similar shape and size, placed just above it, on the axle E.

This axle extends along underneath the bottom of the seed-box F, and has a number of drums, G, and a cog-wheel, H, secured to it.

There is a drum for each compartment in the seed-box, and each one has an opening made in its side, into which the grain and compost fall.

Extending the whole length of the seed-box is the shaft I, which has a number of short arms extending from its sides, and a cog-wheel, K, placed near its centre, which gears with the wheel H, and communicates the motion to the shaft.

Two of the compartments are intended to contain the compost, and two grain.

As the drums revolve, each time the openings in their face come under the seed-box, they are filled from the box just above, and then drop it into the funnels L, and then both together fall through the boots M into the ground.

Secured to the front part of the frame are the levers N, which pass backward through the slotted guides O, and are then pivoted to the boots.

Extending across the frame, back of the seed-box, is the lever P, by means of which the boots are lowered to or raised from the earth, they being connected by the cords or chains R.

S is a hook, which catches the lever after the boots have been raised, and keeps them suspended above the ground.

Attached to the lower ends of the hangers T is a roller, W, which follows along the ground just behind the boots.

The wheel D has a collar cast on its inner side, which has a slot cut around its surface.

In this slot is secured one end of the lever V, by means of which the wheel is thrown in and out of gear.

Upon the back part of the frame, near the driver's seat, is placed the box X, in which tools and implements are placed.

Having thus described my invention,

What I claim, and desire to secure by Letters Patent, is—

1. The seed-box F, divided into compartments for both compost and seed, in combination with the shaft I, wheels K, H, and D, axle E, and drums G, when used substantially as set forth.

2. The funnels L, boots M, levers P and N, hook S, and chain or cord R, when combined in the manner and for the purpose set forth.

3. Box X, wheels C and D, lever V, funnels L, roller W, shaft I, drums G, levers P and N, wheels K and H, and hook S, when all are arranged and combined to form a corn-dropper, substantially as described.

In testimony that I claim the foregoing, I have hereunto set my hand, this 25th day of March, 1869.

C. B. RUTH.

Witnesses:
A. P. SCHURZ,
REUBEN G. RUTH.